United States Patent
Yoo et al.

(10) Patent No.: US 6,237,112 B1
(45) Date of Patent: May 22, 2001

(54) SCSI DEVICE AVAILABLE FOR BREAKDOWN PREDICTION AND SELF-EXAMINATION AND A METHOD THEREOF

(75) Inventors: Seung-Wha Yoo; In-Ho Lee; Hyung-Sun Kim, all of Seoul; Moon-Young Lee, Anyang; Chan-Soo Kim, Sungnam, all of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/105,179

(22) Filed: Jun. 26, 1998

(30) Foreign Application Priority Data

Jul. 10, 1997 (KR) .................................................. 97-32147

(51) Int. Cl.[7] .................................................. G06F 11/00
(52) U.S. Cl. .................................................. 714/30; 714/33
(58) Field of Search .................................. 714/30, 33, 44, 714/34, 42

(56) References Cited

U.S. PATENT DOCUMENTS

| 5,033,049 | 7/1991 | Keener et al. | |
|---|---|---|---|
| 5,361,346 | * 11/1994 | Panesar et al. | 714/42 |
| 5,475,814 | 12/1995 | Tomimitsu | |
| 5,835,700 | * 11/1998 | Carbonneau et al. | 714/44 |
| 5,966,510 | * 10/1999 | Carbonneau et al. | 714/44 |
| 6,009,535 | * 12/1999 | Halligan et al. | 714/5 |

* cited by examiner

Primary Examiner—Ly V. Hua
(74) Attorney, Agent, or Firm—Robert E. Bushnell, Esq.

(57) ABSTRACT

A SCSI device available for breakdown prediction and self-examination or a breakdown prediction and self-examination method by this device which increases the overall system performance through reducing the loading of a master I2C processor and SCSI bus, by reporting to the master I2C processor only when necessary, after an I2C processor reads the status of the SCSI device. The SCSI device available for breakdown prediction and self-examination includes a temperature and motor driving sensor, which monitors the temperature and motor driving status of the SCSI device; a power sensor and a power on/off switch, which monitors the SCSI device power and receives a command from the master I2C processor switch on/off the SCSI device power through the I2C processor; a SMART sensor, which monitors the SCSI device status: a device control logic, which reports all the previous status reports, error reports and SMART functions to the master I2C processor through the SCSI controller; an I2C processor, which reports to the master I2C processor 130 through a SCSI channel or I2C channel, when it is needed, by analyzing all information detected by the temperature, motor driving sensor, power sensor, power on/off switch and SMART sensor.

11 Claims, 3 Drawing Sheets

SCSI DEVICE AVAILABLE FOR BREAKDOWN PREDICTION AND SELF-EXAMINATION AND A METHOD THEREOF

CLAIM OF PRIORITY

This application makes reference to, incorporates the same herein, and claims all benefits accruing under 35 U.S.C §119 from an application entitled *A SCSI Device Available For Breakdown Prediction And Self-Examination And A Method Thereof* earlier filed in the Korean Industrial Property Office on Jul. 10, 1997, and there duly assigned Serial No. 97-32147 by that Office.

BACKGROUND OF THE INVENTION

1. Field of the Invention

The present invention relates to a small computer system interface (SCSI) device capable of breakdown prediction and self-examination, and further relates to a breakdown prediction and self-examination method by this SCSI device. More specifically, the invention relates to a SCSI device capable of breakdown prediction and self-examination, and further relates to a breakdown prediction and self-examination method by this SCSI device which increases overall system performance by reducing the load of a master processor and SCSI bus, by reporting to the master processor only when necessary, after an I2C processor reads the status of the SCSI device.

2. Description of the Related Art

According to increased system speed and emphasis on service availability of a system, the stability of the SCSI device has an important effect upon the overall system performance. Generally, monitoring the operation environment, such as the driving status of the SCSI device, temperature, power, etc. in the SCSI back panel is performed by two methods. One method is to report to a main processor the predictable mechanical failure of the SCSI device, having a Self-Monitoring Analysis and Report Technology (SMART) function, through the SCSI bus. The other method is to poll, periodically, the SCSI device status by the use of a SCSI command (diagnosis command transmission).

An exemplary SCSI back panel comprises a temperature sensor, which monitors the SCSI device temperature, a power sensor, which monitors the SCSI device power, an I2C controller, which accesses the temperature and power information from the temperature sensor and power sensor, an I2C master processor, to which is reported the information about the temperature and power through the I2C bus from the I2C controller, and which sends the command to control the temperature and power of the temperature and power sensor to the I2C controller through the I2C bus. Since the temperature sensor, the power sensor, I2C controller, etc., are not contained within the SCSI device, all monitoring for the operation environment and the operation status about the SCSI device within the SCSI back panel is performed outside the SCSI device. In other words, a prior art method of monitoring the SCSI device status is not the analysis of SCSI device itself but the environment analysis around the SCSI device, and the monitoring accuracy is therefore low. Also this method decreases the system performance if monitoring time for the SCSI device status increases. This causes a decrease in efficiency of monitoring the SCSI device status, because this method limits the amount of monitoring time.

Because the SCSI device doesn't contain the temperature and the power sensor, and because it has limitation in its ability to find the hardware problem in the SCSI device, this method makes the system performance low by adding the load of the SCSI bus and the processor. Because there is no I2C interface within the SCSI device, the SCSI device status can be reported through the SCSI bus only.

Examples of known systems for performing diagnosis on a SCSI device are provided by U.S. Pat. No. 5,033,049 to Don S. Keener et al. entitled *On-Board Diagnostic Sub-System For SCSI Interface* and U.S. Pat. No. 5,475,814 to Yasuham Tomimitsu entitled *Self Diagnosis Of A SCSI Controller Through An I/O Port For Data Transmission/Data Reception Modes Of Operation*.

SUMMARY OF THE INVENTION

Consequently, in order to solve the problems, the object of the invention is to improve overall system performance by reducing the load of the master processor because the I2C processor within the SCSI device monitors the operation status and environment, such as the temperature power, power, etc. and reports, in only needful cases, to the master processor through the SCSI bus or the I2C bus.

Another object of the invention is to provide to diagnose the SCSI device fault and report to the SCSI bus or I2C bus more precisely than a prior art method.

In conclusion, the further object of this invention is to improve the system serviceability and decrease the system fault and the system down to a minimum.

In one preferred mode, in accordance with the invention, it is preferable that a SCSI device available for breakdown prediction and self-examination includes a temperature and motor driving sensor, which monitors the temperature and monitor driving status of the SCSI device; a power sensor, which monitors the SCSI device power and receives a command from the master I2C processor through the I2C processor and monitors the power switch and power on/off switch to switch on/off the SCSI device power; a self monitoring analysis and report technology (SMART) sensor, which monitors the SCSI device status; a device control logic, which reports all the previous status reports, error reports and SMART functions to the master I2C processor through the SCSI controller; an I2C processor, which reports to the master I2C processor through a SCSI channel or I2C channel, when it is needed, by analyzing all information detected by the temperature, motor driving sensor, power sensor, power on/off switch and SMART sensor.

In another preferred mode, in accordance with the invention, it is preferable that a breakdown prediction and self-examination method by the device includes a process, which monitors the temperature and motor driving status of the SCSI device; a process which monitors the SCSI device power; a process, which switches on/off the SCSI device power; a process, which monitors the SCSI device status; a process, which reports all the previous statuses; a process, which reports all the previous errors; a process, which reports the SMART function; a process, which analyzes all information about the SCSI device; a process, which checks if the I2C processor has a fault that it is beyond its limits to process by itself; a process, which reports the information analysis result to the master I2C processor if a fault is detected in the checking process.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
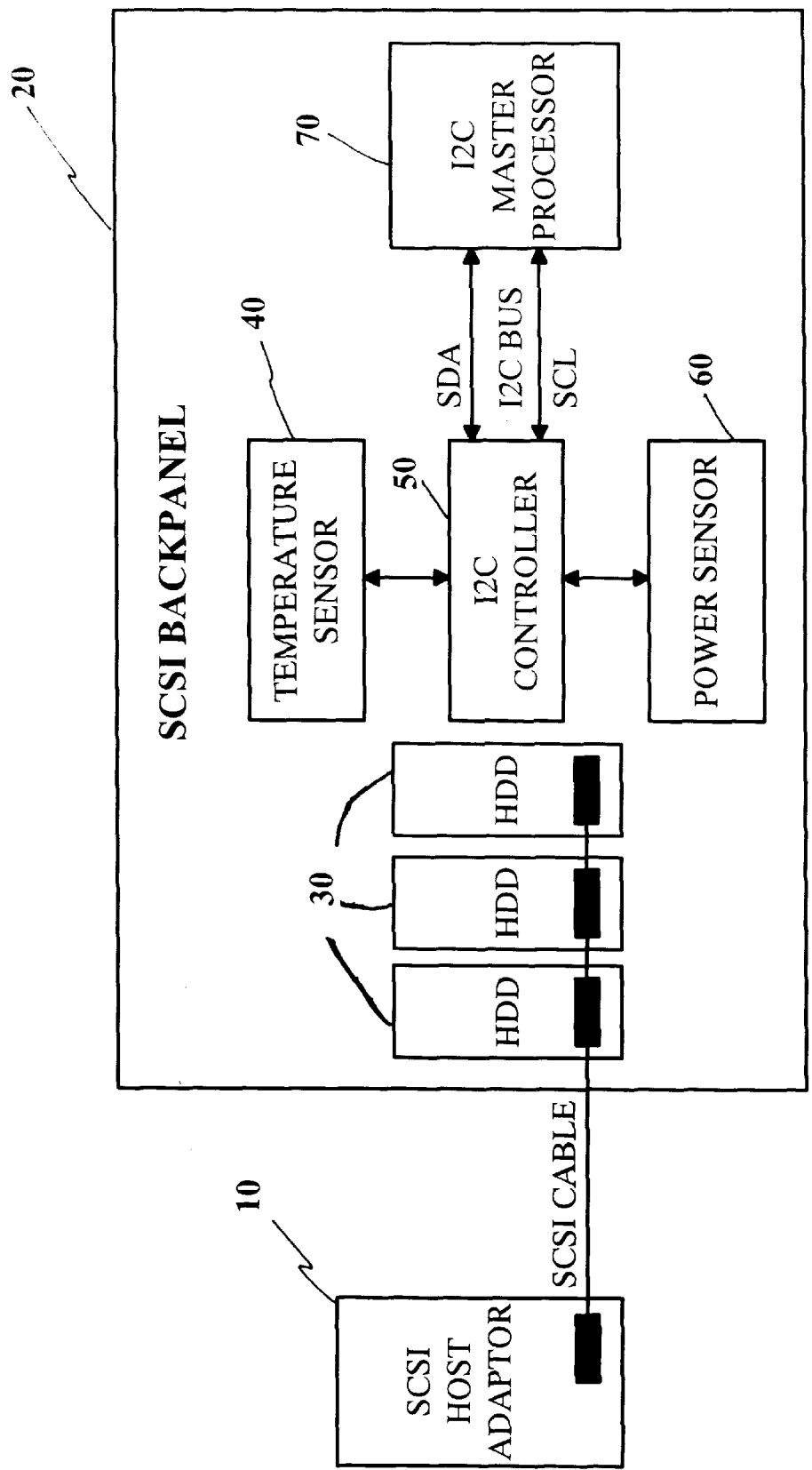
FIG. 1 illustrates a block diagram of the connection between an exemplary SCSI back panel and other constituents.

FIG. 1 illustrates a block diagram of the connection between an exemplary SCSI back panel for a hard disk drive 30 and a SCSI host adaptor 10 via a SCSI cable. The prior SCSI back panel comprises a temperature sensor 40, which monitors the SCSI device temperature, a power sensor 60, which monitors the SCSI device power, an I2C controller 50, which accesses the temperature and power information from the temperature sensor and power sensor, an I2C master processor 70, to which is reported the information about the temperature and power through the I2C bus from the I2C controller, and which sends the command to control the temperature and power of the temperature and power sensors 40, 60 to the I2C controller 50 through the I2C bus.

Figure 2:
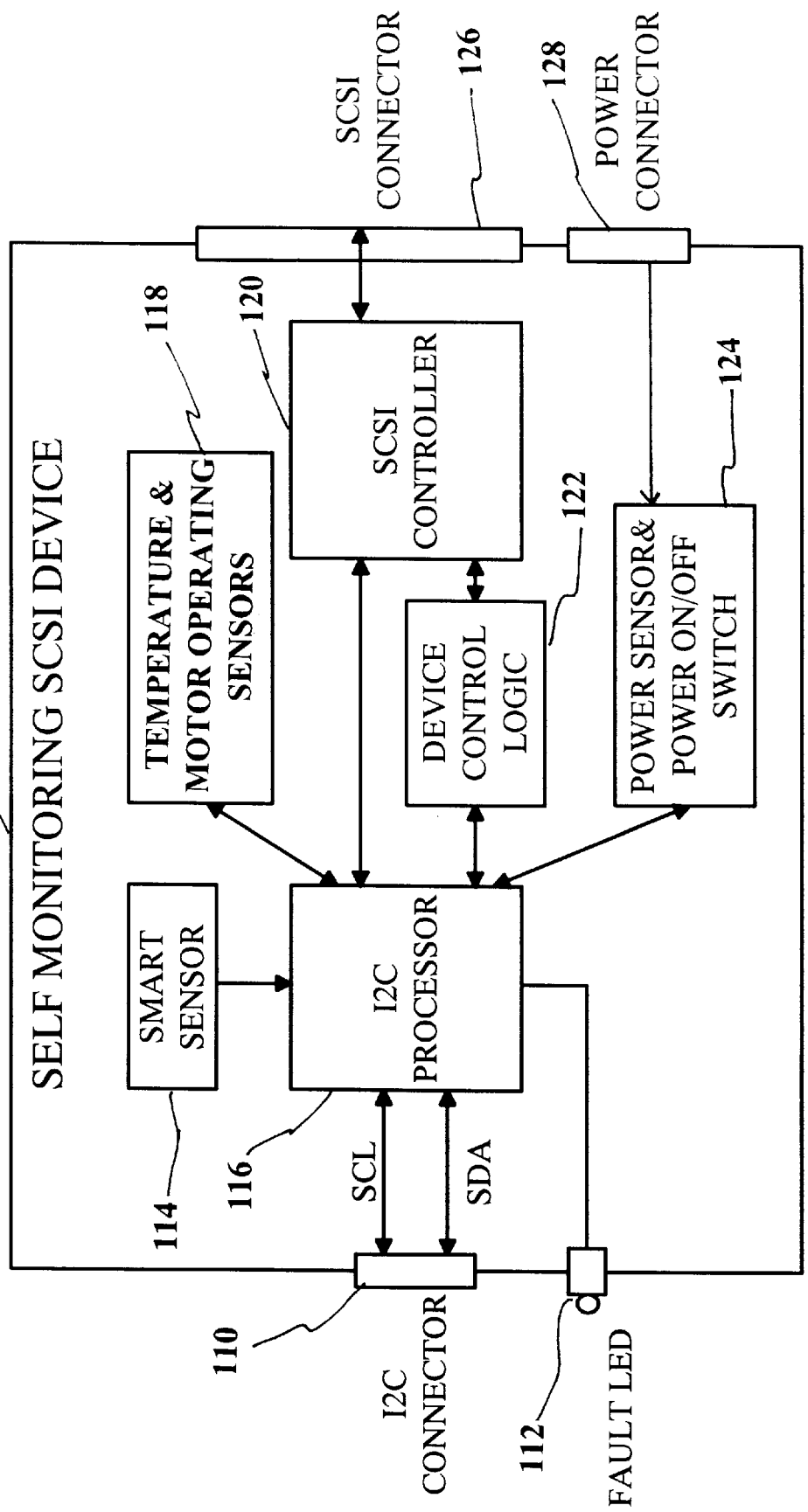
FIG. 2 illustrates a block diagram of an inside circuit available for self monitoring the SCSI device.
Figure 3:
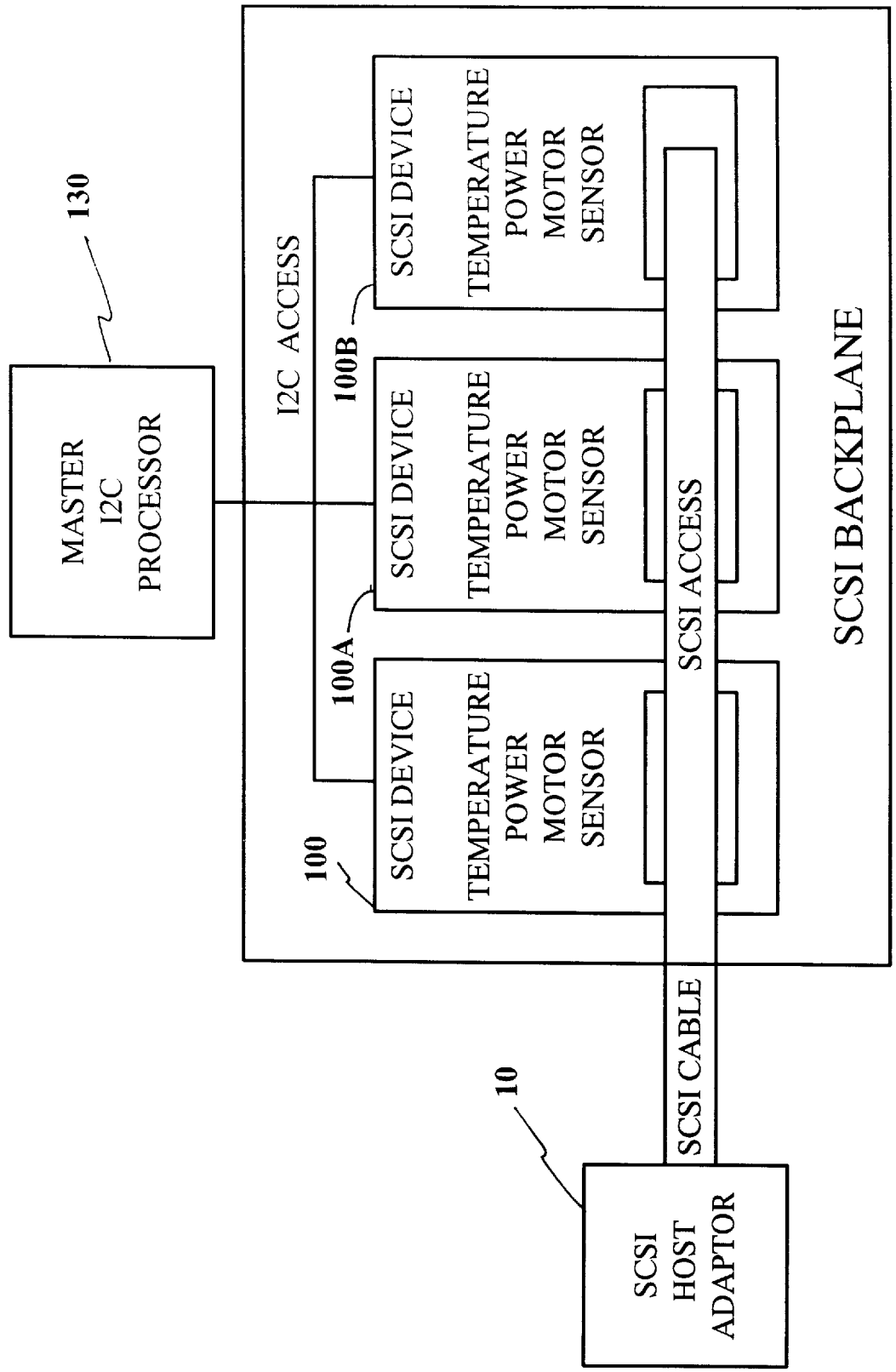
FIG. 3 illustrates a block diagram of the connection between the SCSI back panel by this invention and other constituents.

FIG. 2 illustrates a block diagram of an inside circuit available for self monitoring the SCSI device. Referring now to FIGS. 2 and 3, a preferred embodiment of the invention to solve the object of a SCSI device capable of breakdown prediction and self-examination comprises a temperature and motor driving sensor 118, which monitors the temperature and motor driving status of the SCSI device, a power sensor 124, which monitors the SCSI device power and receives a command from a master I2C processor 130 through an I2C processor 116 and monitors a power switch and power from power connector 128 to switch on/off the SCSI device power, a SMART sensor 114, which monitors the SCSI device status, a device control logic 122, which reports all the previous status reports, error reports and SMART functions to the master I2C processor 130 through a SCSI controller 120. The I2C processor 116 reports to the master I2C processor 130 through a SCSI channel or I2C channel via SCSI connector 126, when it is needed, by analyzing all information detected by temperature and motor driving sensor 118, power sensor and power on/off switch 124 and SMART sensor 114. It is preferable that the SCSI device 100 be one of a hard disk drive (HDD), a tape driver, an advanced intelligent tape drive (AIT) or a digital linear tape drive (DLT). It is also preferred that SCSI device power is switched on/off, through the I2C bus (not shown) connected between an I2C connecter 110 and a host (not shown), by remote control.

Another preferred embodiment of the invention to solve the object of a breakdown prediction and self-examination method of a SCSI device comprises a process, which monitors the temperature and motor driving status of the SCSI device 100, which monitors the SCSI device power, which switches on/off the SCSI device power, which monitors the SCSI device status, which reports all the previous statuses, which reports all the previous errors, which reports the SMART function, which analyzes all information about the SCSI device, which checks if the I2C processor has a fault that it is beyond its limits to process by itself, and which reports the information analysis result to a master I2C processor 130 if a fault is detected in the checking process.

The invention will be explained in further detail with reference to the FIGS. 2 and 3. The invention contains the I2C processor 116 within the SCSI device 100, and self-monitors the inside temperature of the SCSI device, the power status, the motor driving status, the SMART function, all diagnosis and faults report, etc. And the I2C processor 116 is provided to report the fault to the master I2C processor 130 through the SCSI bus or I2C bus. By doing so, the two I2C processors 116 and 130 perceive the monitor function of SCSI device power, temperature and motor driving status, etc. in addition to the diagnosis of SCSI device using the method which reports a predicable mechanical fault of the SCSI device by monitoring the SMART function by SCSI bus device status using the SCSI command (transfer diagnosis command).

Because the I2C processor 116 reports to the master I2C processor 130, only in needful cases, by reading the SCSI device status, it is possible to improve the overall system performance by decreasing of the load of the master I2C processor 130 and SCSI bus, and also to switch on/off the SCSI device fault signal, by itself, through the I2C bus.

Referring to FIG. 3, a SCSI back panel is connected to a SCSI host adaptor 10 via a SCSI cable. The SCSI back panel is further connected to master I2C processor 130 via an I2C bus. The back panel is shown having more than one SCSI device 100, 100A and 100B wherein each SCSI device 100 is capable of self-monitoring and is composed of circuit elements shown in FIG. 2, e.g., a temperature sensor, motor sensor, power sensor, etc. It is possible for each SCSI device to report directly the driving status and driving environment such as the SCSI device temperature and power to the I2C processor 116 within the SCSI device. And a fault is reported to the master I2C processor 130 only when is found that the fault is beyond the limits that the I2C processor 116 can process by itself.

According to the composition, the invention can make the SCSI device status decrease the system fault or the system down time by predictably perceiving the SCSI device status, such as the power status, the temperature, the motor driving status of the SCSI device, etc. It is possible to improve the system performance and monitoring effect of the SCSI device status because the reports are reported to the master I2C processor through the SCSI channel or I2C bus only in case of self-monitoring the SCSI device status. It is also possible to switch on/off remote-controllably the SCSI device power through the I2C bus.

While the invention is susceptible to various modifications and alternative forms, specific embodiments thereof have been shown by way of example in the drawings and described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

What is claimed is:

1. A small computer system interface (SCSI) device available for breakdown prediction and self-examination, comprising:

a temperature and motor driving sensor, which monitors an inside temperature of said SCSI device and monitors a driving status of a motor of said SCSI device;

a power sensor, which monitors SCSI device power and receives a command from a master I2C processor through a I2C processor and monitors a power on/off switch to switch on/off the SCSI device power;

a self-monitoring analysis and report technology (SMART) sensor, which monitors a SCSI device status;

a device control logic, which reports all previous status reports, error reports and SMART functions to a master I2C processor through a SCSI controller; and an I2C processor, which reports a fault to said master I2C processor through a SCSI channel or an I2C channel, when it is determined, by analyzing all information detected by said temperature and motor driving sensor, said power sensor, said power on/off switch and said SMART sensor, that said I2C processor cannot correct said fault.

2. The SCSI device available for breakdown prediction and self-examination as set forth in claim 1, wherein the SCSI device is a hard disk drive.

3. The SCSI device available for breakdown prediction and self-examination as set forth in claim 1, wherein the SCSI device is a tape driver.

4. The SCSI device available for breakdown prediction and self-examination as set forth in claim 1, wherein the SCSI device is an advanced intelligent tape drive.

5. The SCSI device available for breakdown prediction and self-examination as set forth in claim 1, wherein the SCSI device is a digital linear tape drive.

6. The SCSI device available for breakdown prediction and self-examination as set forth in claim 1, wherein the SCSI device power is switched on/off through said I2C bus by remote control.

7. A breakdown prediction and self-examination method of small computer system interface (SCSI) device, said method comprising the steps of:

monitoring an internal temperature and a motor driving status of the SCSI device;

monitoring SCSI device power;

remotely switching on/off the SCSI device power;

monitoring a SCSI device status by using a self-monitoring analysis and report technology (SMART) sensor;

reporting all results of each of said monitoring steps to an I2C processor;

reporting all previous status reports, error reports and SMART functions to a master I2C processor through a SCSI controller; and reporting a fault to said master I2C processor through a SCSI channel or an I2C channel, when it is determined, by analyzing said results of each of said monitoring steps, that said I2C processor cannot correct said fault.

8. The method as set forth in claim 7, wherein said step of monitoring an internal temperature and a motor driving status comprises utilizing a temperature and motor driving sensor internal to said SCSI device.

9. The method as set forth in claim 7, wherein said step of monitoring SCSI device power comprises utilizing a power sensor.

10. The method as set forth in claim 7, wherein said step of remotely switching on/off the SCSI device power comprises the use of a remotely controlled power on/off switch.

11. The method as set forth in claim 7, wherein said step of reporting all previous status reports, error reports and SMART functions to a master I2C processor comprises utilizing a device control logic means, said previous status reports, error reports and SMART functions being stored in said device control logic means.

* * * * *